(12) United States Patent
Carole et al.

(10) Patent No.: US 10,808,000 B2
(45) Date of Patent: Oct. 20, 2020

(54) PROCESS FOR PREPARING PALLADIUM COMPLEXES

(71) Applicant: JOHNSON MATTHEY PUBLIC LIMITED COMPANY, London (GB)

(72) Inventors: William Carole, Wayne, PA (US); Thomas Colacot, Wayne, PA (US); Carin Seechurn, Hertfordshire (GB); Thomas Scrase, Hertfordshire (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/342,309

(22) PCT Filed: Sep. 21, 2017

(86) PCT No.: PCT/GB2017/052819
§ 371 (c)(1),
(2) Date: Apr. 16, 2019

(87) PCT Pub. No.: WO2018/073559
PCT Pub. Date: Apr. 26, 2018

(65) Prior Publication Data
US 2019/0248819 A1    Aug. 15, 2019

Related U.S. Application Data

(60) Provisional application No. 62/410,904, filed on Oct. 21, 2016.

(51) Int. Cl.
*C07F 15/00* (2006.01)
*C07F 9/52* (2006.01)

(52) U.S. Cl.
CPC ............ *C07F 15/0066* (2013.01); *C07F 9/52* (2013.01)

(58) Field of Classification Search
None
See application file for complete search history.

(56) References Cited

U.S. PATENT DOCUMENTS 8,618,318 B2   12/2013  Colacot et al.
8,772,520 B2 *  7/2014  Colacot .................. C07F 17/02
                                                    556/23

FOREIGN PATENT DOCUMENTS

WO    WO 2011012889 A1    2/2011
WO    WO 2013000874 A1    1/2013

OTHER PUBLICATIONS

Proutiere, F. et al. Journal of the American Chemical Society 2012, 134, 606-612.*
Aufiero et al., Highly Efficient C-SeCF$_3$ Coupling of Aryl Iodides Enabled by an Air-Stable Dinuclear Pd$^{I}$ Catalyst, Agnew. Chem. Int Ed. vol. 54, No. 35, Jun. 26, 2015, pp. 10322-10326.
Durá-Vilá V. et al., Reactivity Studies of [PD$_2$ ($\mu$-X)$_2$(PBu$'_3$)$_2$] (X=Br, I) with CNR (R=2,6-dimethylphenyl), H$_2$ and Alkynes, Journal of Organometallic Chemistry, vol. 600, No. 1-2, Apr. 18, 2000, pp. 198-205.
Vilar et al., Synthesis and Structural Characterisation of [Pd$_2$ ($\mu$-Br)$_{2l}$)(PBu$'_3$)$_2$], an Example of a Palladium(I)-Palladium(I) Dimer, Journal of the Chemical Society, Dalton Transactions, Chemical Society, No. 23, Jan. 1, 1996, pp. 4313-4314.
PCT/GB2017/052819 (WO2018/073559) International Search Report dated Jan. 29, 2018.
PCT/GB2017/052819 (WO2018/073559) Written Opinion dated Jan. 29, 2018.

* cited by examiner

*Primary Examiner* — Clinton A Brooks
(74) *Attorney, Agent, or Firm* — BakerHostetler

(57) ABSTRACT

The present invention provides a process for the preparation of a complex of formula (I): comprising the step of reacting Pd(diolefin)X$_2$ or PdX$_2$ and PR$_1$R$_2$R$_3$ in a solvent to form the complex of formula (I), wherein the process is carried out in the absence of a base, the molar ratio of Pd(diolefin)X$_2$: PR$_1$R$_2$R$_3$ or PdX$_2$:PR$_1$R$_2$R$_3$ is greater than 1:1.1, up to about 1:2.5; each X is independently a halide; and R$_1$, R$_2$ and R$_3$ are independently selected from the group consisting of tert-butyl and isopropyl.

20 Claims, No Drawings

PROCESS FOR PREPARING PALLADIUM COMPLEXES

CROSS-REFERENCE TO RELATED APPLICATIONS

This application is the National Stage of International Patent Application No. PCT/GB2017/052819, filed Sep. 21, 2017, which claims priority to U.S. Patent Application No. 62/410,904, filed Oct. 21, 2016, the entire disclosures of both of which are incorporated herein by reference for any and all purposes.

The present invention concerns the preparation of platinum group metal complexes, in particular palladium phosphine complexes.

Palladium(I) tri-tert-butylphosphine halide dimers {[Pd (PtBu$_3$) (μ-Br)]$_2$} and {[Pd (PtBu$_3$) (μ-I)]$_2$} are active catalysts for cross coupling reactions. Palladium(I) tri-tert-butylphosphine bromide dimer has been prepared by reaction of Pd(COD)Br$_2$ with $^t$Bu$_3$P in the presence of an alkali hydroxide (U.S. Pat. No. 8,618,318B2). In U.S. Pat. No. 8,618,318B2, the molar ratio of Pd(diolefin)Br$_2$:$^t$Bu$_3$P was 1:1 to 1:1.1.

WO2013/000874 describes a process for synthesis of the bromide dimer by reaction of PdBr$_2$ with [P(t-Bu)$_3$]$_2$Pd. The reaction of Pd(COD)Br$_2$ with [P(t-Bu)$_3$]$_2$Pd was reported by Dura-Vila et al (J. Organomet. Chem. 600 (2000) 198).

Palladium(I) tri-tert-butylphosphine iodide dimer {[Pd (PtBu$_3$) (μ-I)]$_2$} has been prepared by reaction of PdI$_2$ with [P(t-Bu)$_3$]$_2$Pd (Aufiero et al, Angew. Chem. Int Ed. 2015, 10322).

Both the bromide and the iodide dimers have been prepared in low yield by reacting Pd$_2$dba$_3$.C$_6$H$_6$ in the presence of PtBu$_3$ with CHBr$_3$ and CHI$_3$ respectively (Vilar et al, J. Chem. Soc. Dalton Trans. (1996) 4313).

SUMMARY OF THE INVENTION

The present invention provides improved processes for the preparation of platinum group metal complexes, in particular palladium(I) tri-tert-butylphosphine bromide dimer and palladium(I) tri-tert-butylphosphine iodide dimer. In some embodiments the processes result in higher yield of the palladium(I) halide dimeric products than previously reported. In some embodiments, the processes result in a product, such as palladium(I) tri-tert-butylphosphine bromide dimer, containing fewer impurities. In some embodiments, the product is obtained pure as analysed by NMR and/or elemental analysis.

In one aspect, the present invention provides a process for the preparation of a complex of formula (I):

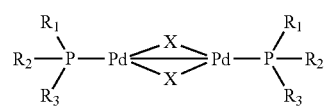

(I)

comprising the step of reacting Pd(diolefin)X$_2$ or PdX$_2$ and PR$_1$R$_2$R$_3$ in a solvent to form the complex of formula (I), wherein
the process is carried out in the absence of a base,
the molar ratio of Pd(diolefin)X$_2$:PR$_1$R$_2$R$_3$ or PdX$_2$: PR$_1$R$_2$R$_3$ is greater than 1:1.1, up to about 1:2.5,
each X is independently a halide; and
R$_1$, R$_2$ and R$_3$ are independently selected from the group consisting of tert-butyl and iso-propyl.

In another aspect, a process for the preparation of a complex of formula (I) comprising the step of reacting a compound of formula (II):

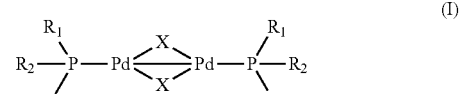

(I)

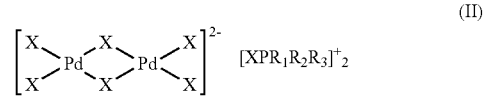

(II)

a) with an alkali hydroxide; or
b) with [PR$_1$R$_2$R$_3$]$_2$Pd,
in a solvent to form the complex of formula (I),
wherein
each X is independently a halide; and
R$_1$, R$_2$ and R$_3$ are independently selected from the group consisting of tert-butyl and iso-propyl.

The invention also provides a compound of formula (II)

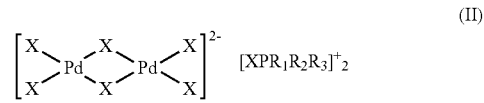

(II)

wherein
each X is independently a halide; and
R$_1$, R$_2$ and R$_3$ are independently selected from the group consisting of tert-butyl and iso-propyl.

In another aspect, the invention provides a process for the preparation of a compound of formula (II)

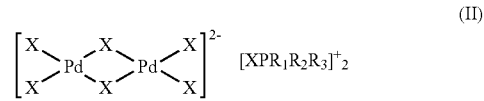

(II)

comprising the step of reacting Pd(diolefin)X$_2$ or PdX$_2$ with [X][XPR$_1$R$_2$R$_3$] in a solvent to form
the complex of formula (II),
wherein
each X is independently a halide; and
R$_1$, R$_2$ and R$_3$ are independently selected from the group consisting of tert-butyl and iso-propyl.

Another aspect of the invention provides a process for the preparation of [PR$_1$R$_2$R$_3$]$_2$Pd comprising the step of reacting Pd(diolefin)X$_2$ or PdX$_2$ and PR$_1$R$_2$R$_3$ in a solvent, wherein
the process is carried out in the absence of a base,
the molar ratio of Pd(diolefin)X$_2$:PR$_1$R$_2$R$_3$ or PdX$_2$: PR$_1$R$_2$R$_3$ is at least 1:3, and wherein each X is independently a halide; and
R$_1$, R$_2$ and R$_3$ are independently selected from the group consisting of tert-butyl and iso-propyl.

Definitions

The point of attachment of a moiety or substituent is represented by "-". For example, —OH is attached through the oxygen atom.

"Alkyl" refers to a straight-chain or branched saturated hydrocarbon group. In certain embodiments, the alkyl group may have from 1-20 carbon atoms, in certain embodiments from 1-15 carbon atoms, in certain embodiments, 1-8 carbon atoms. The alkyl group may be unsubstituted. Alternatively, the alkyl group may be substituted. Unless otherwise specified, the alkyl group may be attached at any suitable carbon atom and, if substituted, may be substituted at any suitable atom. Typical alkyl groups include but are not limited to methyl, ethyl, n-propyl, iso-propyl, n-butyl, iso-butyl, sec-butyl, tert-butyl, n-pentyl, n-hexyl and the like.

"Aryl" refers to an aromatic carbocyclic group. The aryl group may have a single ring or multiple condensed rings. In certain embodiments, the aryl group can have from 6-20 carbon atoms, in certain embodiments from 6-15 carbon atoms, in certain embodiments, 6-12 carbon atoms. The aryl group may be unsubstituted. Alternatively, the aryl group may be substituted. Unless otherwise specified, the aryl group may be attached at any suitable carbon atom and, if substituted, may be substituted at any suitable atom. Examples of aryl groups include, but are not limited to, phenyl, naphthyl, anthracenyl and the like.

DETAILED DESCRIPTION

As mentioned, in the first aspect of the invention, a process is provided for the preparation of a complex of formula (I):

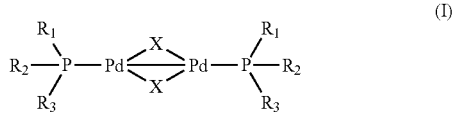

(I)

comprising the step of reacting $Pd(diolefin)X_2$ or $PdX_2$ and $PR_1R_2R_3$ in a solvent to form the complex of formula (I), wherein
the process is carried out in the absence of a base, the molar ratio of $Pd(diolefin)X_2:PR_1R_2R_3$ or $PdX_2:PR_1R_2R_3$ is greater than 1:1.1, up to about 1:2.5,
each X is independently a halide,
$R_1$, $R_2$ and $R_3$ are independently selected from the group consisting of tert-butyl and iso-propyl.

The process uses readily available starting materials $Pd(diolefin)X_2$ or $PdX_2$, and $PR_1R_2R_3$, is operationally simple and is therefore more suited to large-scale manufacture.

$PR_1R_2R_3$ can be selected from $P(t-Bu)_3$ or $P(i-Pr)(t-Bu)_2$.

The halide may be chloride, bromide or iodide. Preferably, the halide is bromide or iodide. Suitable $PdX_2$ complexes include $PdCl_2$, $PdBr_2$ and $PdI_2$, preferably $PdBr_2$ and $PdI_2$. The $Pd(diolefin)X_2$ contains a cyclic diolefin, more preferably 2,5-norbornadiene (NBD) or 1,5-cyclooctadiene (COD). Suitable $Pd(diolefin)X_2$ compounds therefore include $Pd(COD)Br_2$, $Pd(NBD)Br_2$ and $Pd(COD)I_2$. $Pd(COD)Br_2$ or $Pd(COD)I_2$ are particularly preferred.

Alternatively, the diolefin can be replaced by two molecules of a monoolefin. In this instance, the monoolefin may be selected from the group consisting of a straight-chain $C_{2-10}$ alkene, a branched $C_{2-10}$ alkene, a $C_{5-10}$ cycloalkene and combinations thereof. More preferably, the monoolefin is ethylene or cyclooctene.

The $Pd(diolefin)X_2$ or $PdX_2$ compound and the $PR_1R_2R_3$ ligand are mixed together in a solvent. The solvent may be a $C_{6-10}$ aromatic hydrocarbon. Preferably, the solvent is selected from the group consisting of benzene, toluene and xylene. Particularly preferred solvents are xylene or toluene. In certain embodiments, the solvent is xylene, which has been shown to increase the yield of the complex of formula (I).

The concentration of $Pd(diolefin)X_2$ in the solvent is preferably about 0.1 mol/L to about 2.5 mol/L and more preferably, about 0.2 mol/L to about 2 mol/L. The concentration of $PdX_2$ in the solvent is preferably about 0.01 mol/L to about 1.5 mol/L and more preferably, about 0.03 mol/L to about 1 mol/L.

The $PR_1R_2R_3$ ligand may be used as a solid or, more preferably, as a solution in a solvent such as toluene or xylene.

In the present invention, the molar ratio $Pd(diolefin)X_2:PR_1R_2R_3$ or $PdX_2:PR_1R_2R_3$ is greater than 1:1.1, up to about 1:2.5. At a Pd:P ratio in this range the complex of formula (I) is formed as the major product (Scheme 1, equation b). The major product is the desired palladium-containing product formed in a greater amount than any other palladium-containing product in the reaction mixture.

Suitable molar ratios $Pd(diolefin)X_2:PR_1R_2R_3$ or $PdX_2:PR_1R_2R_3$ include but are not limited to 1:1.15, 1:1.2, 1:1.25, 1:1.3, 1:1.35, 1:1.4, 1:1.45, 1:1.5, 1:1.55, 1:1.6, 1:1.65, 1:1.7, 1:1.75, 1:1.8, 1:1.85, 1:1.9, 1:1.95, 1:2.0, 1:2.05, 1:2.1, 1:2.15, 1:2.2, 1:2.25, 1:2.3, 1:2.35, 1:2.4, 1:2.45. The preferred molar ratio is about 1:1.5.

Without wishing to be bound by theory, it is believed that when the molar ratio $Pd(diolefin)X_2:PR_1R_2R_3$ or $PdX_2:PR_1R_2R_3$ is less than 1:1.1, such as 1:1 (Scheme 1, equation a), the reaction of $Pd(diolefin)X_2$ or $PdX_2$ with $PR_1R_2R_3$ in the solvent gives a mixture of complex of formula (I) and a complex of formula (II). Further addition of an alkali hydroxide to this reaction mixture may be required to convert the complex of formula (II) to the complex of formula (I).

Scheme 1. Yields Based on Pd, Theoretical Yield in Parentheses

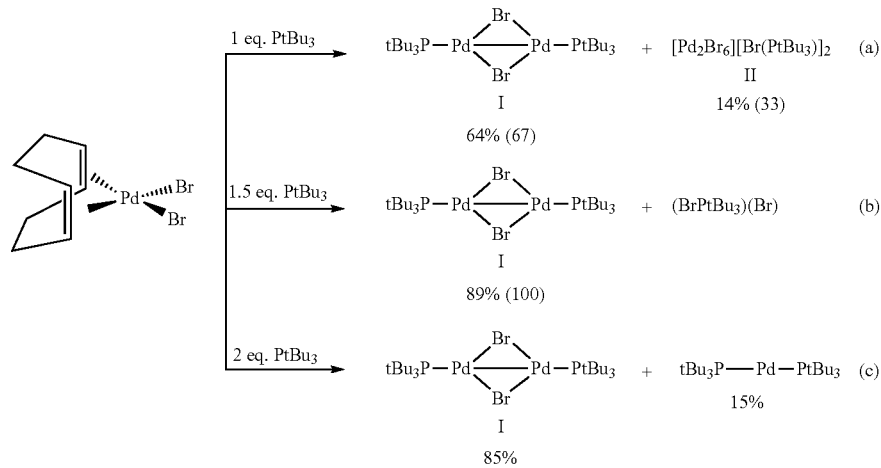

In reacting the Pd(diolefin)$X_2$ or $PdX_2$, and $PR_1R_2R_3$ in the solvent, the components may be mixed in any suitable order, although preferably the Pd(diolefin)$X_2$ or $PdX_2$ is first added to the solvent, followed by $PR_1R_2R_3$.

After the Pd(diolefin)$X_2$ or $PdX_2$ compound and the $PR_1R_2R_3$ ligand are mixed together in the solvent, preferably the reaction mixture is stirred at a temperature in the range of about 00° C. to about 40° C., preferably about 5° C. to about 35° C. The mixture may be stirred for a period e.g. preferably about 1 minute to about 5 hours, more preferably about 30 minutes to about 4.5 hours and most preferably about 45 minutes to about 4 hours.

In another embodiment, the process of the present invention further comprises the step of preparing a complex of formula (I') by independently exchanging one or more of the groups X for X',

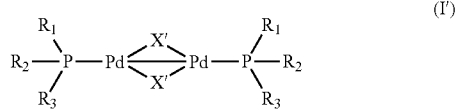
(I')

wherein each X' is a halide which is different to the corresponding group X in the complex of formula (I).

The anion exchange may be conveniently carried out by combining the complex of formula (I) with a YX' salt, wherein Y is an alkali metal cation (such as K+ or Na+) or a quaternary ammonium cation ($[R_4N]^+$), wherein R is selected from the group consisting of straight chain, branched or cyclic $C_{1-20}$ alkyl and X' is as defined above, in a solvent. The components may be combined in any suitable order, although it is preferred that the complex of formula (I) in a solvent is combined with the YX' salt in a solvent. Examples of suitable YX' salts include NaI and tetra-n-butylammonium iodide. Examples of suitable solvents include straight chain, branched or cyclic $C_{1-10}$ alkanol, such as methanol. Preferably, the anion exchange is conducted under an inert atmosphere (such as argon or nitrogen).

On completion of the reaction, the complexes of formulae (I) or (I') are separated from the reaction mixture by any appropriate method which is dependent on the physical form of the product. For example, when it is desired to recover the complexes of formulae (I) or (I') as a solid, the complexes may be isolated from the reaction mixture by precipitation.

Precipitation may occur by the addition of a suitable solvent. The solvent may be a straight chain, branched or cyclic $C_{1-10}$ alkanol. Preferably, the solvent is selected from the group consisting of methanol, ethanol, 2-propanol, 1-butanol, 2-butanol, 3-methyl-2-butanol, 2-methyl-2-butanol, 3-methyl-1-butanol. A particularly preferred solvent is methanol.

After the addition of the solvent, preferably the reaction mixture is stirred at a temperature in the range of about 0° C. to about 40° C., preferably about 5° C. to about 35° C. The mixture may be stirred for a period e.g. preferably about 1 minute to about 1 hour, more preferably about 5 minutes to about 45 minutes.

The complex may then be isolated by filtering, decanting or centrifuging. The separated complex is preferably washed with further solvent and then dried. Drying may be performed using known methods, for example, at temperatures in the range of about 10-60° C. and preferably about 20-40° C. under about 1-30 mbar vacuum for about 1 hour to about 5 days.

It is preferred that all steps in the preparation and isolation of the complex of formula (I) are conducted under an inert atmosphere (e.g. nitrogen or argon). In addition, as the complexes of formulae (I) or (I') are not stable in water, it is desirable that the quantity of water which may be present in any of the solvents utilised is controlled. In one embodiment of the invention, therefore, the solvents are anhydrous.

Another aspect of the invention provides a compound of formula (II):

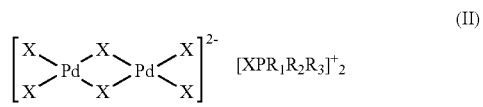
(II)

wherein
each X is independently a halide; and
$R_1$, $R_2$ and $R_3$ are independently selected from the group consisting of tert-butyl and iso-propyl.

Each X is independently a halide and is as generally described above. $PR_1R_2R_3$ is as generally described above.

In one embodiment, the compound of formula (II) is $[Pd_2Br_6][BrP(t-Bu)_3]_2$.

In another embodiment, the compound of formula (II) is $[Pd_2I_6][IP(t-Bu)_3]_2$.

In another aspect of the invention, a process is provided for the preparation of a compound of formula (II)

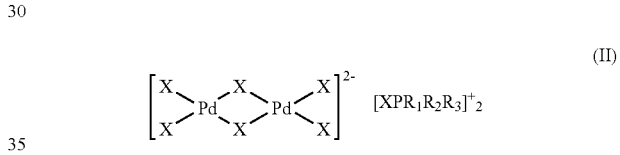
(II)

comprising the step of reacting Pd(diolefin)$X_2$ or $PdX_2$ with $[X][XPR_1R_2R_3]$ in a solvent to form the complex of formula (II),
wherein
each X is independently a halide, and
$R_1$, $R_2$ and $R_3$ are independently selected from the group consisting of tert-butyl and iso-propyl.

Each X is independently a halide and is as generally described above. $PR_1R_2R_3$, the diolefin, Pd(diolefin)$X_2$, $PdX_2$ are as generally described above.

The Pd(diolefin)$X_2$ or $PdX_2$ compound and $[X][XPR_1R_2R_3]$ are mixed together in a solvent. The solvent is selected from the group consisting of a $C_{6-10}$ aromatic hydrocarbon, a $C_{2-10}$ ether and combinations thereof. Preferably, the solvent is selected from the group consisting of xylene, toluene, benzene, tetrahydrofuran, dioxane and combinations thereof. A preferred solvent is toluene or tetrahydrofuran.

After the Pd(diolefin)$X_2$ or $PdX_2$ compound and $[X][XPR_1R_2R_3]$ are mixed together in the solvent, preferably the reaction mixture is stirred at a temperature in the range of about 0° C. to about 40° C., preferably about 5° C. to about 35° C. The mixture may be stirred for a period e.g. preferably about 12 hours to about 5 days, more preferably about 4 days.

On completion of the reaction, the complex of formula (II) may be separated from the reaction mixture as generally described above.

$PR_1R_2R_3$ may be mixed with $X_2$ in a solvent to form $[X][XPR_1R_2R_3]$. X is preferably bromide or iodide. The solvent is a $C_{6-10}$ aromatic hydrocarbon, preferably toluene.

The reaction mixture is stirred at a temperature in the range of about 0° C. to about 40° C., preferably about 5° C. to about 35° C. It is preferred that all steps in the preparation and isolation of [X][XPR$_1$R$_2$R$_3$] are conducted under an inert atmosphere (e.g. nitrogen or argon). [X][XPR$_1$R$_2$R$_3$] may then be isolated by filtering, decanting or centrifuging. The separated complex is preferably washed with further solvent and then dried.

In yet another aspect of the invention, a process is provided for the preparation of a complex of formula (I) comprising the step of reacting a compound of formula (II):

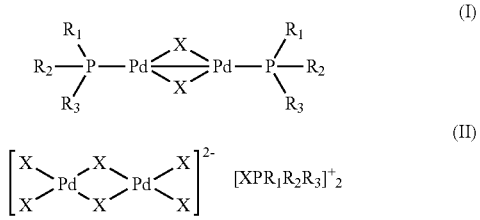

a) with an alkali hydroxide; or
b) with [PR$_1$R$_2$R$_3$]$_2$Pd,
in a solvent to form the complex of formula (I),
wherein
each X is independently a halide, and
R$_1$, R$_2$ and R$_3$ are independently selected from the group consisting of tert-butyl and iso-propyl.

Each X is independently a halide and is as generally described above. PR$_1$R$_2$R$_3$ is as generally described above.

The solvent may be selected from a group consisting of a straight chain, branched or cyclic C$_{1-10}$ alkanol, a C$_{6-10}$ aromatic hydrocarbon and combinations thereof. Preferably, the solvent is selected from the group consisting of methanol, ethanol, 2-propanol, 1-butanol, 2-butanol, 3-methyl-2-butanol, 3-methyl-1-butanol, benzene, toluene and combinations thereof. Particularly preferred solvents are methanol and toluene. The concentration of the compound of formula (II) in the solvent is preferably about 0.01 mol/L to about 1.0 mol/L.

The molar ratio of compound of formula (II): alkali hydroxide may be about 1:3.

An alkali hydroxide may be added to a suspension of the compound of formula (II) in a solvent. The alkali hydroxide may be potassium hydroxide or sodium hydroxide, preferably sodium hydroxide. In one embodiment, the alkali hydroxide is dissolved in a straight chain, branched or cyclic C$_{1-10}$ alkanol and then added to the reaction mixture as a solution. Suitable alkanols are methanol, ethanol, 2-propanol, 1-butanol, 2-butanol, 3-methyl-2-butanol, 3-methyl-1-butanol or a combination thereof. Preferably, the alkanol is methanol. The alkali hydroxide/alkanol solution may be used in any suitable concentration, for example, in the range of about 0.05 mol/L to about 3 mol/L, preferably about 0.1 mol/L to about 2.5 mol/L.

After the addition of the alkali hydroxide, preferably the reaction mixture is stirred at a temperature in the range of about 5° C. to about 35° C. The mixture may be stirred for a period e.g. preferably about 10 minute to about 3 hours, more preferably about 30 minutes to about 2 hours.

Alternatively, the compound of formula (II) and [PR$_1$R$_2$R$_3$]$_2$Pd may be mixed together then a solvent is added. The solvent may be selected from a group consisting of a straight chain, branched or cyclic C$_{1-10}$ alkanol, a C$_{6-10}$ aromatic hydrocarbon and combinations thereof. Preferably, the solvent is selected from the group consisting of methanol, ethanol, 2-propanol, 1-butanol, 2-butanol, 3-methyl-2-butanol, 2-methyl-2-butanol, 3-methyl-1-butanol, benzene, toluene and combinations thereof. Particularly preferred solvents are methanol and toluene. The concentration of the compound of formula (II) in the solvent is preferably about 0.01 mol/L to about 1.0 mol/L.

The molar ratio of compound of formula (II): [PR$_1$R$_2$R$_3$]$_2$Pd may be about 1:2.

The reaction mixture may be stirred at a temperature in the range of about 5° C. to about 35° C. The mixture may be stirred for a period e.g. preferably about 10 minute to about 3 hours, more preferably about 20 minutes to about 2 hours.

On completion of the reaction, the complex of formula (I) can be separated from the reaction mixture by any appropriate method which is dependent on the physical form of the product. For example, when it is desired to recover the complex of formula (I) as a solid, the complex may be isolated from the reaction mixture by precipitation.

Precipitation may occur by the addition of a suitable solvent. The solvent may be a straight chain, branched or cyclic C$_{1-10}$ alkanol. Preferably, the solvent is selected from the group consisting of methanol, ethanol, 2-propanol, 1-butanol, 2-butanol, 3-methyl-2-butanol, 2-methyl-2-butanol, 3-methyl-1-butanol. A particularly preferred solvent is methanol.

After the addition of the solvent, preferably the reaction mixture is stirred at a temperature in the range of about 0° C. to about 40° C., preferably about 5° C. to about 35° C. The mixture may be stirred for a period e.g. preferably about 1 minute to about 1 hour, more preferably about 5 minutes to about 45 minutes.

The complex may then be isolated as generally described above.

Another aspect of the invention provides a process for the preparation of [PR$_1$R$_2$R$_3$]$_2$Pd comprising the step of reacting Pd(diolefin)X$_2$ or PdX$_2$ and PR$_1$R$_2$R$_3$ in a solvent,
wherein
the process is carried out in the absence of a base,
the molar ratio of Pd(diolefin)X$_2$:PR$_1$R$_2$R$_3$ or PdX$_2$:PR$_1$R$_2$R$_3$ is at least 1:3, and wherein each X is independently a halide; and
R$_1$, R$_2$ and R$_3$ are independently selected from the group consisting of tert-butyl and iso-propyl.

The halide, diolefin and suitable Pd(diolefin)X$_2$ or PdX$_2$ are as generally described above.

The Pd(diolefin)X$_2$ or PdX$_2$ compound and the PR$_1$R$_2$R$_3$ phosphine ligand are mixed together in a solvent. The solvent is a C$_{6-10}$ aromatic hydrocarbon. Preferably, the solvent is selected from the group consisting of benzene, toluene and xylene. Particularly preferred solvents are xylene or toluene.

The PR$_1$R$_2$R$_3$ ligand may be used as a solid or, more preferably, as a solution in a solvent such as toluene or xylene.

The ratio Pd(diolefin)X$_2$:PR$_1$R$_2$R$_3$ or PdX$_2$:PR$_1$R$_2$R$_3$ is at least 1:3, wherein [PR$_1$R$_2$R$_3$]$_2$Pd is formed as the major product.

In the present invention, when the molar ratio Pd(diolefin)X$_2$:PR$_1$R$_2$R$_3$ or PdX$_2$:PR$_1$R$_2$R$_3$ is at least 1:1.2, the complex of formula (I) is formed as the major product (Scheme 1, reaction b). Without wishing to be bound by theory, when the molar ratio Pd(diolefin)X$_2$:PR$_1$R$_2$R$_3$ or PdX$_2$:PR$_1$R$_2$R$_3$ is more than 1:2, reacting Pd(diolefin)X$_2$ or PdX$_2$ with PR$_1$R$_2$R$_3$ in a solvent gives a mixture of complex of formula (I) and [PR$_1$R$_2$R$_3$]$_2$Pd. When the ratio Pd(diolefin)X$_2$: PR$_1$R$_2$R$_3$ or PdX$_2$:PR$_1$R$_2$R$_3$ is 1:2 the complex of formula (I) and [PR$_1$R$_2$R$_3$]$_2$Pd are formed in a ratio 85:15, whereas when the ratio Pd(diolefin)X$_2$:PR$_1$R$_2$R$_3$ is 1:3 the complex of formula (I) and [PR$_1$R$_2$R$_3$]$_2$Pd are formed in a ratio 5:95 according to $^{31}$P NMR spectroscopy (entries 1 and 2). Therefore, by increasing the ratio of Pd(diolefin)X$_2$: PR$_1$R$_2$R$_3$, [PR$_1$R$_2$R$_3$]$_2$Pd is formed in 100% yield.

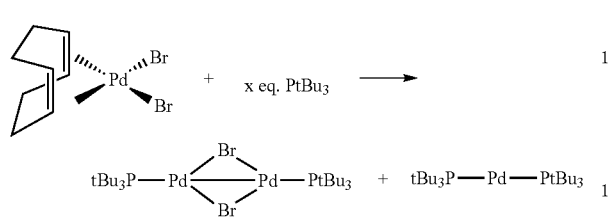

TABLE 1

Ratio between the complex of formula (I) and [PR$_1$R$_2$R$_3$]$_2$Pd depending on the ratio between Pd(diolefin)X$_2$ and PR$_1$R$_2$R$_3$ as determined by $^{31}$P NMR spectroscopy

| Entry | x (eq. Pt—Bu$_3$) | {Pd(Br)[P(t-Bu)$_3$]}$_2$ | Pd[P(t-Bu)$_3$]$_2$ |
|---|---|---|---|
| 1 | 2 | 85 | 15 |
| 2 | 3 | 5 | 95 |
| 3 | 3.5 | 0 | 100 |
| 4 | 4 | 0 | 100 |

In reacting the Pd(diolefin)X$_2$ or PdX$_2$ and PR$_1$R$_2$R$_3$ in the solvent, the components may be mixed in any suitable order, although preferably the Pd(diolefin)X$_2$ or PdX$_2$ is first added to the solvent, followed by PR$_1$R$_2$R$_3$.

After the Pd(diolefin)X$_2$ or PdX$_2$ compound and the PR$_1$R$_2$R$_3$ ligand are mixed together in the solvent, preferably the reaction mixture is stirred at a temperature in the range of about 0° C. to about 40° C., preferably about 50° C. to about 35° C. The mixture may be stirred for a period e.g. preferably about 1 minute to about 5 hours, more preferably about 30 minutes to about 4.5 hours and most preferably about 45 minutes to about 4 hours.

On completion of the reaction, [PR$_1$R$_2$R$_3$]$_2$Pd is separated from the reaction mixture by any appropriate method which is dependent on the physical form of the product. For example, when it is desired to recover [PR$_1$R$_2$R$_3$]$_2$Pd as a solid, the complex may be isolated from the reaction mixture by precipitation.

Precipitation may occur by the addition of a suitable solvent. The solvent may be a straight chain, branched or cyclic C$_{1-10}$ alkanol. Preferably, the solvent is selected from the group consisting of methanol, ethanol, 2-propanol, 1-butanol, 2-butanol, 3-methyl-2-butanol, 2-methyl-2-butanol, 3-methyl-1-butanol. A particularly preferred solvent is methanol.

After the addition of the solvent, preferably the reaction mixture is stirred at a temperature in the range of about 0° C. to about 40° C., preferably about 5° C. to about 35° C. The mixture may be stirred for a period e.g. preferably about 1 minute to about 1 hour, more preferably about 5 minutes to about 45 minutes.

The complex may then be isolated as generally described above.

In certain embodiments, the processes of the present invention are high yielding. In certain embodiments, the complexes of formula (I), (II) and [PR$_1$R$_2$R$_3$]$_2$Pd obtained are pure.

The invention will be further illustrated by reference to the following non-limiting Examples.

EXAMPLES

Example 1. {Pd(Br)[P(t-Bu)$_3$]}$_2$

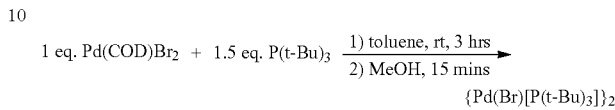

A Schlenk flask is charged with Pd(COD)Br$_2$ (1.0 g, 2.69 mmol) and a stirrer bar, evacuated and backfilled with N$_2$ three times. Toluene (2 mL) is added, followed by P(t-Bu)$_3$ (1 M in toluene, 4.03 mmol, 4.0 mL). The reaction mixture is stirred at room temperature for 3 hrs, then MeOH (10 mL) is added and the mixture stirred for another 15 mins. The resulting solid is isolated by filtration and washed with MeOH (5×5 mL). The resulting green crystalline solid is dried in vacuo to provide the title compound (849 mg, 81%).

Example 2. {Pd(Br)[P(t-Bu)$_3$]}$_2$

To a 500 mL Schlenk flask is added 13.7 g Pd(COD)Br$_2$ and stir bar. The flask is sealed and degassed 3×, backfilling with nitrogen. To the flask is added 92.9 g of a 12 wt % solution of tBu$_3$P in Xylenes via cannula air-free. Mixing begins immediately. The reaction is stirred for 4 hours at room temperature after which a green slurry results. To the flask is added 135 mL of anhydrous methanol via syringe air-free over 7 minutes. The resulting slurry is stirred at room temperature for 18 minutes. The slurry is then filtered air-free using a 200 mL schlenk frit under nitrogen. The flask is rinsed with 30 mL of anhydrous methanol which is then used to slurry the final product on the frit. The product is washed once more with 30 mL anhydrous methanol. The solids are dried under house vacuum with a nitrogen sweep for 30 minutes after which the Schlenk frit is transferred to a glovebox for packaging. Collected 13.8 g blue-green crystals for 97% yield. Sample tests pure by elemental analysis and NMR spectroscopy ($^1$H/$^{31}$P). Expected: C, 37.09; H, 7.00. Found: C, 37.27; H, 6.93.

Example 3. {Pd(Br)[P(t-Bu)$_3$]}$_2$

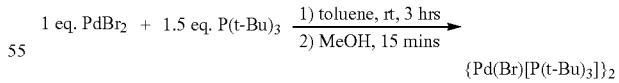

A Schlenk flask is charged with PdBr$_2$ (176 mg, 0.66 mmol) and toluene (5 mL) followed by a solution of P(t-Bu)$_3$ (1.0 M in toluene, 1.0 mL, 1.0 mmol). The reaction mixture is stirred at room temperature under nitrogen for 3 hours. Then MeOH (6 mL) is added and the green reaction mixture stirred for another 20 minutes. The resulting green solid is isolated by filtration under nitrogen, washed with MeOH (5×3 mL) and dried in vacuo to provide the title compound (130 mg, 50%).

Example 4. {Pd(I)[P(t-Bu)₃]}₂

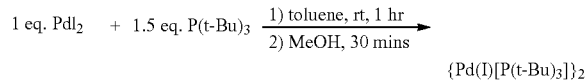

PdI₂ (360 mg, 1.0 mmol) is placed under N₂ and suspended in dry toluene (5 mL). The reaction flask is evacuated and backfilled with N₂ five times. Then P(t-Bu)s (1 M in toluene, 1.5 mmol, 1.5 mL) is added and the reaction mixture stirred at room temperature for 1 hour. MeOH (20 mL) is then added and the mixture stirred another 30 mins. The resulting solid is isolated by filtration and dried in vacuo to provide the title compound (350 mg, 80%). NMR analysis conforms to reported spectra.

Example 5. {Pd(I)[P(t-Bu)₃]}₂

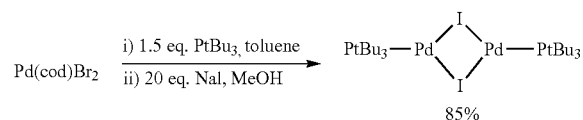

A Schlenk flask is charged with Pd(COD)Br₂ (0.5 g, 1.35 mmol) and a stirrer bar, sealed and evacuated and backfilled with N₂ three times. The flask is taken into the glove box and P(t-Bu)s (1 M in toluene, 2.0 mmol, 2.0 mL) is added. The sealed flask is removed from the glove box, attached to the Schlenk line and another 1 mL toluene is added. The reaction mixture is stirred at room temperature under nitrogen for 2 hrs, then a solution of NaI (2.02 g, 13.44 mmol) in MeOH (5 mL) is added and the mixture stirred for another hour. The resulting dark purple solid is isolated by filtration and washed with MeOH (5×5 mL). The resulting dark purple crystalline solid is dried in vacuo to provide the title compound (503 mg, 85%).

Example 6. {Pd(I)[P(t-Bu)₃]}₂

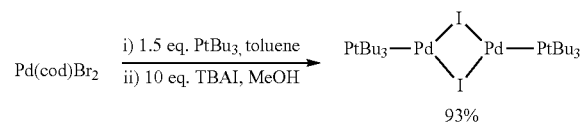

A Schlenk flask is charged with Pd(COD)Br₂ (0.5 g, 1.35 mmol) and a stirrer bar, sealed and evacuated and backfilled with N₂ three times. The flask is taken into the glove box and P(t-Bu)₃ (1 M in toluene, 2.0 mmol, 2.0 mL) is added. The sealed flask is removed from the glove box, attached to the Schlenk line and another 1 mL toluene is added. The reaction mixture is stirred at room temperature under nitrogen for 2 hrs, then a solution of TBAI (tetra-n-butylammonium iodide) (2.48 g, 6.72 mmol) in MeOH (5 mL) is added and the mixture stirred for another hour. The resulting dark purple solid is isolated by filtration and washed with MeOH (5×5 mL). The resulting dark purple crystalline solid is dried in vacuo to provide the title compound (548 mg, 93%).

Example 7. Pd(COD)Br₂+1 eq. PtBu₃

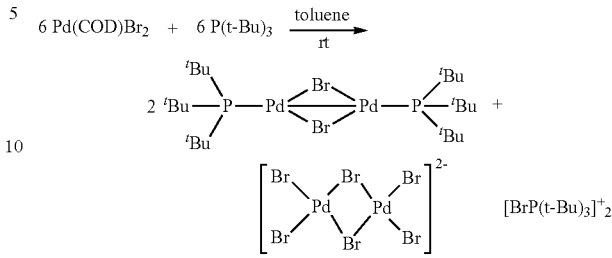

Pd(COD)Br₂ (9190 mg, 24.72 mmol) is weighed into a RB flask and transferred into glovebox. P(t-Bu₃) solution in toluene (1 M, 24.72 mL, 24.72 mmol) is then added and the flask removed from the glove box. Toluene (50 mL) is then added and the reaction mixture stirred under N₂ for 2 hours. The reaction mixture is then filtered and the resulting red solid washed with THF (500 mL). Red solid is dried and recrystallised by adding hexane (30 mL) to a MeOH/acetone (50:30 mL) solution of the red solid. Overnight, this provides [Pd₂Br₆][BrP(t-Bu)₃]₂ as dark red needle-like crystals (1.47 g, 10%). ¹H NMR (acetone-d6, 400 MHz): δ 1.91 (d, J 17.6, 27H); ³¹P NMR (acetone-d6, 162 MHz): δ 124.9; Anal. Calcd for $C_{24}H_{54}Br_8P_2Pd_2$: C, 22.94; H, 4.33; P, 4.93. Found: C, 22.97; H, 4.23; P, 5.01. The filtrate is taken to dryness on rotary evaporator. Resulting solid is washed with MeOH (150 mL) to give {Pd(Br)[P(t-Bu)₃]}₂ (6.09 g, 64%) on filter and red filtrate.

Example 8. [Br][BrP(t-Bu)₃]

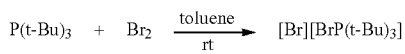

Br₂ (0.10 mL, 310 mg, 1.9 mmol) is added to P(t-Bu)₃ (1.0 M in toluene, 1.9 mL, 1.9 mmol) in a Schlenk flask under N₂. This results in an exothermic reaction, with an orange solid precipitating out of the initially red solution. The precipitate is isolated by filtration and washed with acetone (2 mL) to provide [Br][BrP(t-Bu)₃] as an off-white solid (537 mg, 78%). 5 ¹H NMR (CD₃OD, 400 MHz): δ 1.77 (d, J 17.6, 27H); ³¹P NMR (CD₃OD, 162 MHz): δ 124.9; Anal. Calcd for $C_{12}H_{27}Br_2P$: C, 39.80; H, 7.52; Br, 44.13; P, 8.55. Found: C, 39.52; H, 7.42; Br, 43.83; P, 8.29.

Example 9. [Pd₂Br₆][BrP(t-Bu)₃]₂

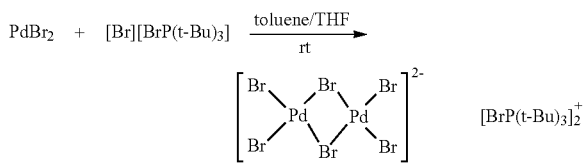

PdBr₂ was stirred in acetone overnight, then filtered and dried. A Schlenk flask is charged with the purified PdBr₂ (500 mg, 1.88 mmol) and [Br][BrP(t-Bu)₃] (676 mg, 1.88 mmol) and evacuated, backfilled with N₂. Toluene (5 mL)

and THF (3 mL) are added and the reaction mixture stirred at room temperature for four days. Then, the resulting solid is filtered and washed with toluene (5 mL). Dark red solid dried in vacuo (1.03 g, 87%) $^1$H NMR (acetone-d6, 400 MHz): δ 1.91 (d, J 17.6, 27H); $^{31}$P NMR (acetone-d6, 162 MHz): δ 124.9. Anal. Calcd for $C_{24}H_{54}Br_8P_2Pd_2$: C, 22.94; H, 4.33; P, 4.93. Found: C, 22.36; H, 4.19; P, 4.85.

Example 10. $\{Pd(Br)[P(t-Bu)_3]\}_2$

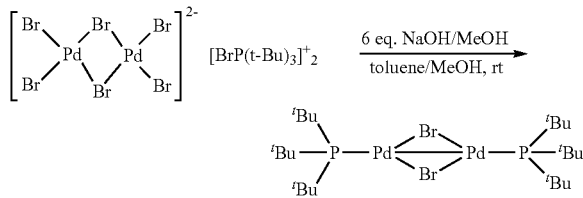

$[Pd_2Br_6][BrP(t-Bu)_3]_2$ (150 mg, 0.12 mmol) is suspended in toluene (1 mL) in a Schlenk flask under an $N_2$ atmosphere. MeOH (1 mL) is added to give a dark red reaction mixture. Then, a NaOH/MeOH solution (1 M, 0.71 mL, 0.71 mmol) is added dropwise and the resulting dark green reaction mixture stirred at room temperature for one hour. Subsequently, a further 4 mL MeOH is added and the mixture stirred for 10 min before the resulting green solid is isolated by filtration under $N_2$. The solid is washed with MeOH (3 mL) and dried in vacuo to give $\{Pd(Br)[P(t-Bu)_3]\}_2$ (89 mg, 89% yield). Product tested pure by $^1$H and $^{31}$P NMR analysis. Anal. Calcd for $C_{24}H_{54}Br_2P_2Pd_2$: C, 37.09; H, 7.00; P, 7.97. Found: C, 36.73; H, 6.81; P, 7.76.

Example 11. $\{Pd(Br)[P(t-Bu)_3]\}_2$

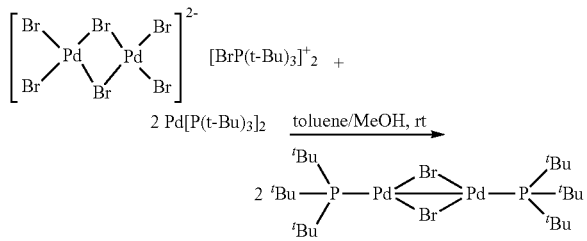

A Schlenk flask is charged with $[Pd_2Br_6][BrP(t-Bu)_3]_2$ (100 mg, 0.080 mmol) and $[P(t-Bu)_3]_2Pd$ (81 mg, 0.16 mmol), evacuated and backfilled with $N_2$ three times. Then toluene (2 mL) and MeOH (2 mL) are added and the resulting dark green reaction mixture stirred for 30 min at room temperature. Then, a further 3 mL MeOH is added and the reaction mixture stirred for another 10 min before the resulting dark green solid is isolated by filtration under $N_2$, washed with MeOH (3 mL) and dried in vacuo (119 mg, 96% yield). Product tested pure by $^1$H and $^{31}$P NMR analysis. Anal. Calcd for $C_{24}H_{54}Br_2P_2Pd_2$: C, 37.09; H, 7.00; P, 7.97. Found: C, 37.21; H, 6.90; P, 7.80.

Example 12

A Schlenk flask is charged with $Pd(COD)Br_2$ (250 mg, 0.67 mmol) and transferred into a glove box. Inside the glove box, the appropriate amount of $P(t-Bu)_3$ ligand is added (1 M solution in toluene). The flask is sealed and removed from the glove box. The final reaction mixture is diluted with toluene to reach a 0.32 M solution. The reaction mixture is stirred at room temperature for 2.5 hours, then 4 mL MeOH is added and the mixture stirred another 10 minutes. The resulting solid is isolated by filtration under $N_2$ and washed with MeOH (4 mL). The final product is dried in vacuo and analysed by $^1$H and $^{31}$P NMR.

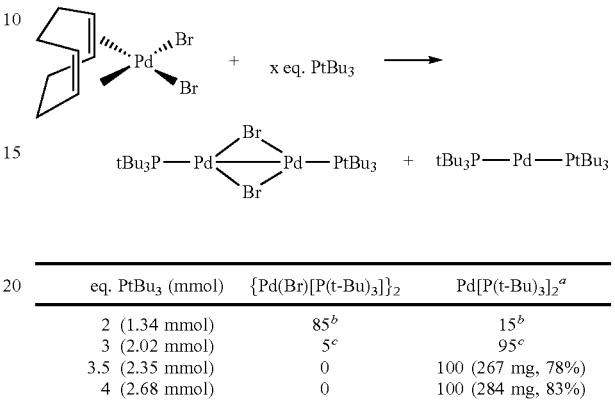

| eq. PtBu$_3$ (mmol) | $\{Pd(Br)[P(t-Bu)_3]\}_2$ | $Pd[P(t-Bu)_3]_2$[a] |
|---|---|---|
| 2 (1.34 mmol) | 85[b] | 15[b] |
| 3 (2.02 mmol) | 5[c] | 95[c] |
| 3.5 (2.35 mmol) | 0 | 100 (267 mg, 78%) |
| 4 (2.68 mmol) | 0 | 100 (284 mg, 83%) |

[a]isolated yield in parenthesis
[b]Combined mass of 220 mg.
[c]Combines mass of 262 mg.

The invention claimed is:

1. A process for preparing a complex of formula (I):

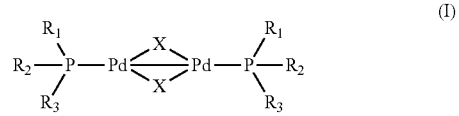

comprising the step of reacting Pd(diolefin)X$_2$ or PdX$_2$ and PR$_1$R$_2$R$_3$ in a solvent to form the complex of formula (I), wherein:
the process is carried out in the absence of a base,
the molar ratio of Pd(diolefin)X$_2$:PR$_1$R$_2$R$_3$ or PdX$_2$:PR$_1$R$_2$R$_3$ is in a range of from greater than 1:1.1 to about 1:2.5;
each X is independently a halide; and
R$_1$, R$_2$ and R$_3$ are, independently, tert-butyl or iso-propyl.

2. The process of claim 1, wherein the diolefin is a cyclic diolefin or two molecules of a monoolefin.

3. The process of claim 1, wherein the solvent is a C$_{6-10}$ aromatic hydrocarbon.

4. The process of claim 1, wherein the molar ratio of Pd(diolefin)X$_2$:PR$_1$R$_2$R$_3$ or PdX$_2$:PR$_1$R$_2$R$_3$ is about 1:1.5.

5. The process of claim 1, further comprising the step of preparing a complex of formula (I'):

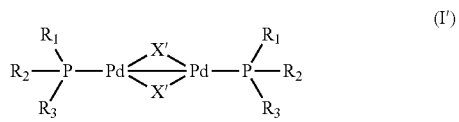

by independently exchanging one or more of X for X', wherein each X' is a halide which is different than the corresponding group X in the complex of formula (I).

6. A process for preparing a complex of formula (I), comprising the step of reacting a compound of formula (II):

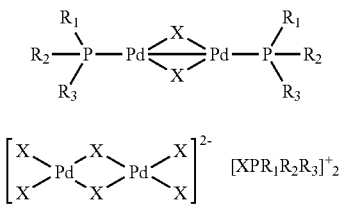

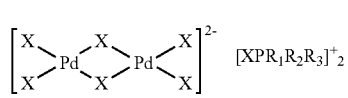

(a) with an alkali hydroxide; or
(b) with $[PR_1R_2R_3]_2Pd$, in a solvent to form the complex of formula (I), wherein
each X is independently a halide; and
$R_1$, $R_2$ and $R_3$ are, independently, tert-butyl or iso-propyl.

7. The process of claim 6, wherein the solvent is a straight-chain, branched or cyclic $C_{1-10}$ alkanol, a $C_{6-10}$ aromatic hydrocarbon, or a combination thereof.

8. The process of claim 6, wherein the alkali hydroxide is potassium hydroxide or sodium hydroxide.

9. The process of claim 6, wherein the molar ratio of the compound of formula (II): alkali hydroxide is about 1:3.

10. The process of claim 6, wherein the molar ratio of the compound of formula (II): $[PR_1R_2R_3]_2Pd$ is about 1:2.

11. A compound of formula (II):

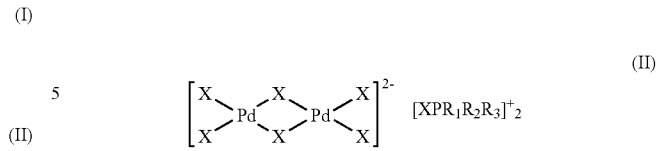

wherein:
each X is independently a halide, and
$R_1$, $R_2$ and $R_3$ are, independently, tert-butyl or iso-propyl.

12. A process for preparing a compound of formula (II):

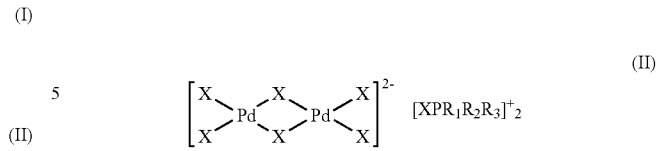

comprising the step of reacting $Pd(diolefin)X_2$ or $PdX_2$ with $[X][XPR_1R_2R_3]$ in a solvent to form the complex of formula (II), wherein:
each X is independently a halide; and
$R_1$, $R_2$ and $R_3$ are, independently, tert-butyl or iso-propyl.

13. The process of claim 12, wherein the diolefin is a cyclic diolefin or two molecules of a monoolefin.

14. The process of claim 12, wherein the solvent is a $C_{6-10}$ aromatic hydrocarbon, a $C_{2-10}$ ether, or a combination thereof.

15. The process of claim 14, wherein the solvent is xylene, toluene, benzene, tetrahydrofuran, dioxane, or a combination thereof.

16. The process of claim 12, wherein $[X][XPR_1R_2R_3]$ is prepared by reacting $PR_1R_2R_3$ with $X_2$ in a solvent to form $[X][XPR_1R_2R_3]$.

17. A process for preparing $[PR_1R_2R_3]_2Pd$, comprising the step of reacting $Pd(diolefin)X_2$ or $PdX_2$ and $PR_1R_2R_3$ in a solvent, wherein:
the process is carried out in the absence of a base,
the molar ratio of $Pd(diolefin)X_2$:$PR_1R_2R_3$ or $PdX_2$:$PR_1R_2R_3$ is at least 1:3, and wherein:
each X is independently a halide; and
$R_1$, $R_2$ and $R_3$ are, independently, tert-butyl or iso-propyl.

18. The process of claim 17, wherein the diolefin is a cyclic diolefin or two molecules of a monoolefin.

19. The process of claim 17, wherein the solvent is a $C_{6-10}$ aromatic hydrocarbon.

20. The process of claim 17, wherein the molar ratio of $Pd(diolefin)X_2$:$PR_1R_2R_3$ or $PdX_2$:$PR_1R_2R_3$ is about 1:4.

* * * * *